Dec. 4, 1945.  R. J. McNITT  2,390,115
APPARATUS FOR PURIFYING LIGHT METALS
Filed Oct. 15, 1941  3 Sheets-Sheet 1
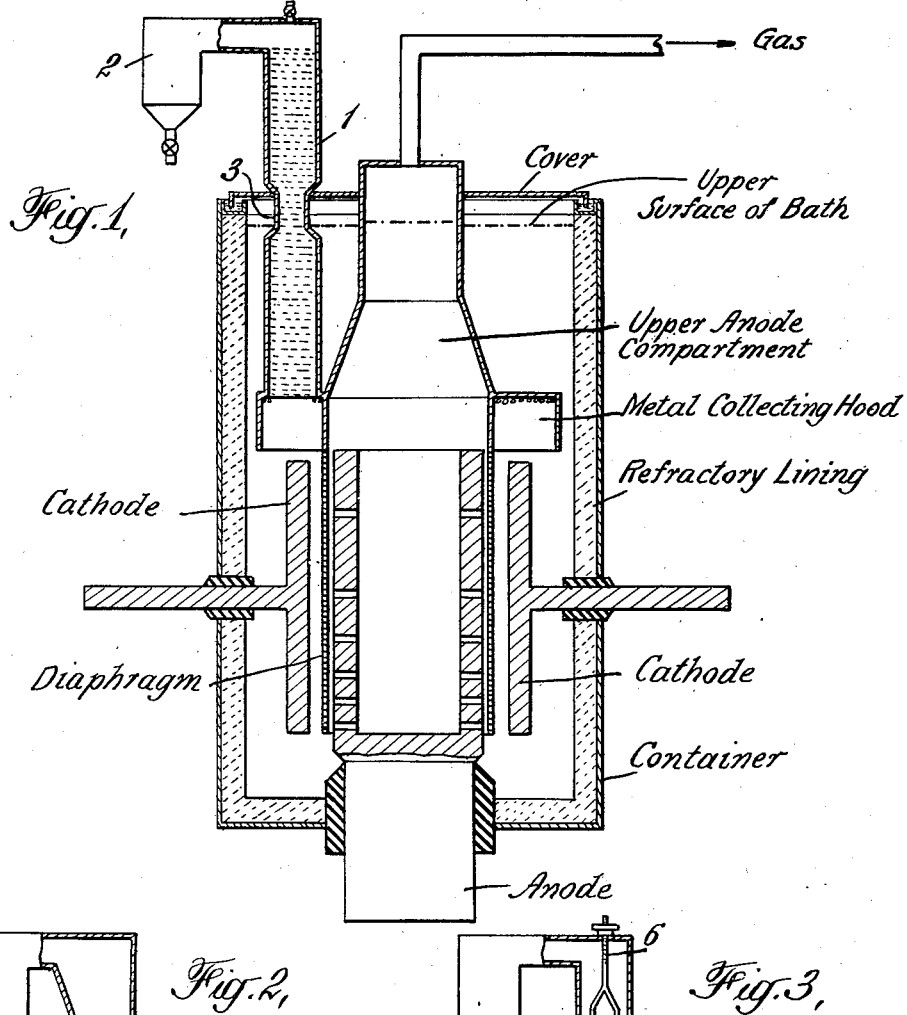
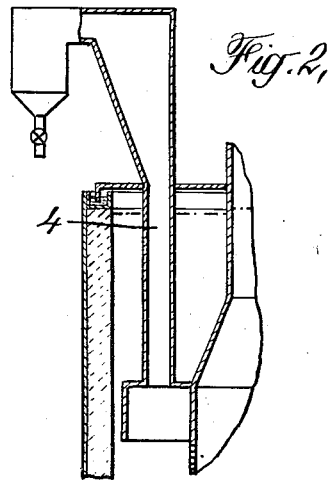
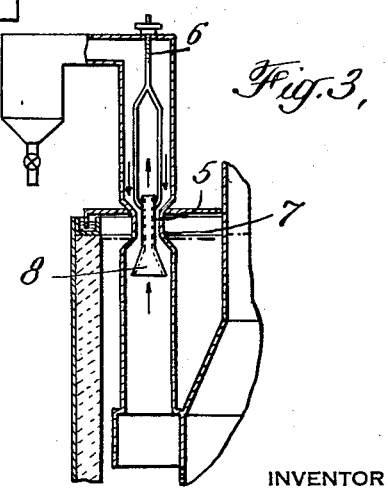
INVENTOR
Robert J. McNitt
BY
Pennie, Davis, Marvin & Edmonds
ATTORNEYS

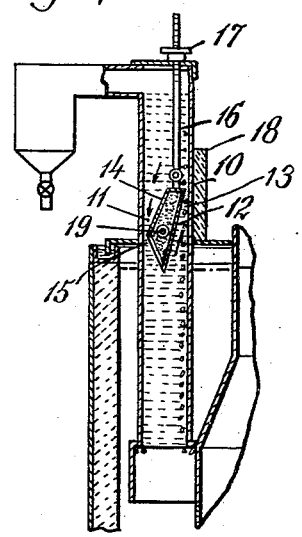
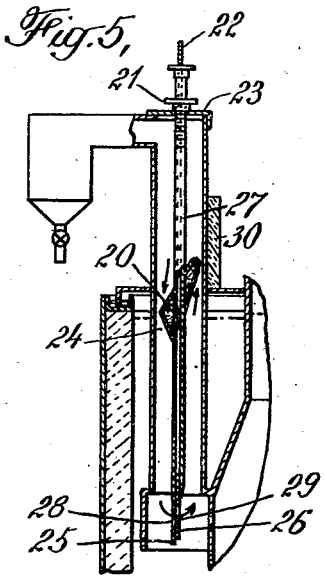
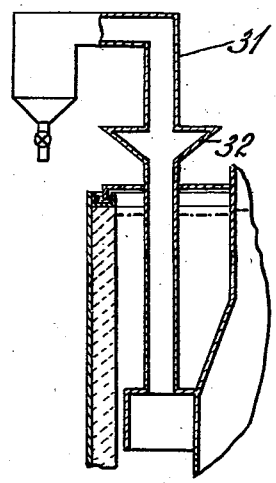
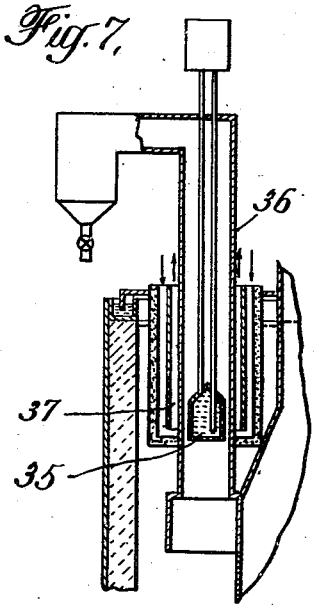
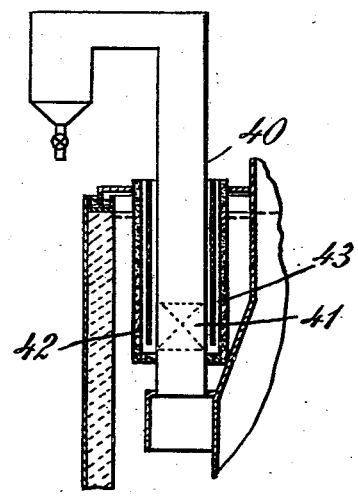
INVENTOR
Robert J. McNitt
BY
Pennie, Davis, Marvin & Edmonds
ATTORNEYS

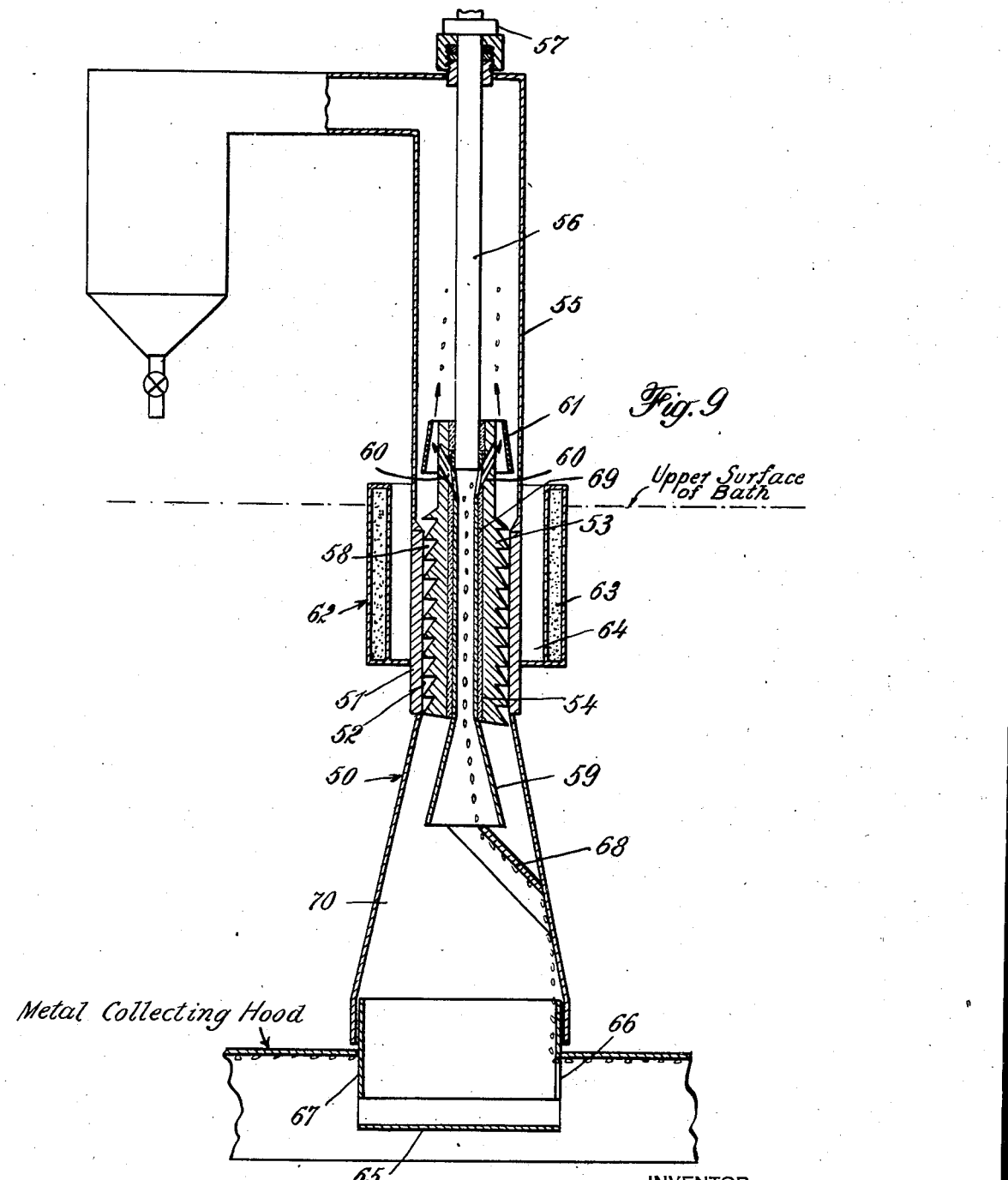

Patented Dec. 4, 1945

2,390,115

UNITED STATES PATENT OFFICE 2,390,115

APPARATUS FOR PURIFYING LIGHT METALS

Robert J. McNitt, Perth Amboy, N. J.

Application October 15, 1941, Serial No. 415,094

8 Claims. (Cl. 210—52.5)

This invention relates to the recovery of light metals from a fused bath which is more dense than the metal. It pertains particularly to the recovery of light metals which are produced by chemical or electro-chemical action in baths of fused salts and to the recovery of light metals from fused baths in which the metals have been placed for purification.

The invention is of special advantage when applied to the recovery of metals which have a melting point far below the temperature of the bath from which the metals are recovered and which contain impurities which are held in solution at the temperature of the fused bath but are thrown out of solution at temperatures near the melting point of the metal and, being more dense than the metal, may be separated therefrom by sedimentation.

In a method widely used for the recovery of these metals, globules are collected under a hood submerged in the fused bath and led to an opening in the roof of the hood connecting with the lower end of a pipe (hereinafter called the "delivery duct") which extends upright through the upper surface of the bath. The globules of metal collected under the hood coalesce into a mass of crude metal which by reason of its low specific gravity rises above the upper surface of the bath in the delivery duct and at the upper part of the duct overflows into a receiver for the metal as fast as the metal is collected under the submerged hood. Above the upper surface of the bath the outside of the delivery duct is exposed to the air and the metal rising therein is cooled sufficiently by conduction of heat through the wall of the duct to precipitate most of the impurities which are dissolved in the crude metal. The precipitated impurities fall back through the delivery duct into the bath.

This method has not been entirely satisfactory. Particles of the molten bath and mixtures of metal and impurities which are carried up into the delivery duct with the light metal congeal as the metal comes in contact with the cool upper wall of the delivery duct and a cement-like mass including metal, salt and other impurities forms accretions on the wall of the duct, which must be removed by scrapers to prevent the obstruction from completely blocking the upward flow of metal. Even with the use of scrapers blockages occur which seriously restrict the flow of metal and make necessary the replacement of the duct. This difficulty causes considerable expense and through frequent operation of the scraper in the small duct interferes with the settling back into the bath of the sedimentary impurities. When the difference in temperature between the metal in the lower part of the delivery duct which is submerged in the bath and the metal in the upper part of the duct is great, thermal convection currents in the metal in the duct cause agitation which seriously interferes with the sedimentation of impurities.

Another source of interference with sedimentation lies in the gas which appears in the fused bath and is collected with the crude metal. This gas, for example hydrogen, enters the delivery duct with the metal and rising through the column in bubbles not only interferes with the return of sedimentary impurities to the bath but sometimes carries slugs of the crude metal and masses of impurities over into the receiver.

As the diameter of the delivery duct is made greater to take care of an increased flow of metal, the difficulties increase since the flow of heat into the column of metal in the duct from the fused bath depends to a large extent on the cross-sectional area of the duct, whereas the cooling surface of the duct wall increases in proportion to the diameter. Thus in the larger duct the means temperature of the metal in the duct will be found at a point higher up and more intense cooling must be applied at the upper end of the duct with more trouble due to accretions and less opportunity for thorough sedimentation of impurities.

This invention aims to avoid these difficulties by suppressing the flow of heat from the bath up through the column of metal in the delivery duct, thus reducing the quantity of heat which must be dissipated in lowering the temperature of the metal to the desired point before it overflows into the receiver and reducing the agitation caused by powerful thermal convection currents in the column of metal in the duct.

An aim of this invention is to control the amount of heat transferred from the bath to the metal in the upper part of the duct by regulating the cross-section of the duct at a suitable point.

Another aim of the invention is to control the amount of heat transferred from the bath to the metal in the upper part of the duct by regulating the amount of metal which circulates between the lower and upper parts of the duct rising with the hot crude metal from the lower part of the duct into the upper part of the duct and returning more or less cooled to the lower part of the duct. I may regulate the circulation of the metal by varying the cross-section of the passage through which it flows, or by means of a mechanical pump or measuring device.

In one application of the invention I reduce the cross-sectional area of the metal in the duct in the lower portion thereof to increase the resistance to the flow of heat to upper portions of the metal in the duct. I may accomplish this resistance to the flow of heat by confining a portion of the duct to a small opening as by the use of an orifice of the desired small area.

In another application of the invention I decrease the temperature of the metal in the lower portion of the duct to such an extent that the flow of heat above the place where the temperature is decreased is very effectively suppressed. In suppressing the upward flow of heat in one application of the invention, I extract heat from the metal to reduce the heat pressure which otherwise forces heat upward into the metal in the duct. I may extract the heat by suitable means as will be apparent from the following discussion, or use thermal barriers in the duct to block the flow of heat upward.

In accordance with my invention, I may suppress the flow of heat up through the column of metal above those places where heat can flow through the duct into the metal therein as, for example, places below the bath where heat flows from the bath through the duct, and places above the bath where radiant heat flows from the bath surface through the duct. I may, accordingly, arrange the means to suppress the upward flow of heat in the duct at suitable places below or above the upper surface of the bath or directly above the cover of covered baths. In suppressing the flow of heat at a place below the cell cover or below the upper surface of the bath, places where heat normally flows into the metal through the wall of the duct, I surround the duct with a thermal insulating barrier to reduce to a minimum the lateral flow of heat into the duct and permit the heat suppressing means of the invention to be used at low positions and the advantages of the invention to be realized through a greater part of the delivery duct.

By way of illustration, I shall describe the invention as applied to the production of sodium and chlorine by the electrolysis of fused sodium chloride, and more particularly a fused mixed bath of sodium chloride and calcium chloride.

In the accompanying drawings:

Fig. 1 is a vertical sectional view through an electrolytic cell embodying the invention;

Figs. 2, 3, 4, 5, 6 and 7 are fragmentary sectional views of an electrolytic cell illustrating other embodiments of the invention;

Fig. 8 is a vertical sectional view of an electrolytic cell illustrating an adaptation of the embodiments of the invention illustrated in Figs. 1 to 7, and Fig. 9 is a fragmentary sectional view of an electrolytic cell illustrating another embodiment of the invention.

The electrolytic cell illustrated in the drawings is of the type comprising a container for a fused salt bath, a carbon anode, an annular cathode surrounding the anode, a diaphragm, an enclosed upper anode compartment wherein the anodic gas is collected, and a metal collecting hood beneath the upper surface of the bath and above the cathode.

The metal collected under the hood enters the metal delivery duct I through which it rises and overflows at the top into the metal receiver 2. At a place slightly above the upper surface of the bath, I decrease the cross-sectional area of the duct to provide a constricted opening 3 through which the metal flows. As a result of the decreased cross-sectional area, the resistance to the upward flow of heat in the metal in the duct is very appreciably increased. With a duct of uniform cross-sectional area, there is an unimpeded flow of heat through the duct by thermal conduction in the metal and there is a large amount of heat transferred from the bath to the upper part of the duct by unimpeded thermal convection currents circulating in the metal and carrying hot metal to the upper part of the duct in addition to the crude metal. To dissipate this heat from the upper part of the duct in order to reduce the temperature of the metal to a point near its freezing point such intensive cooling of the wall of the duct is required that objectionable accretions form rapidly on the inner surface of the wall.

By suppressing the flow of heat from the lower part of the duct to the upper part of the duct, the amount of heat to be dissipated per unit area of duct wall is reduced and the temperature of the metal can be lowered with moderate cooling of the wall of the duct and with relatively little formation of accretions, provided a duct of suitable design and proportions is chosen with due regard for the rate at which the metal is to be recovered. Furthermore, by increasing the resistance to the flow of heat by the constriction 3, there results a decrease in the temperature immediately above that point in the duct so that more of the dissolved impurities are precipitated and separated from the metal before it reaches the extreme upper portion of the duct, and there is less agitation due to thermal convection currents in the cooling metal which also favors more complete sedimentation of the impurities.

The invention aims not only to suppress the conduction of heat through the column of metal in the delivery duct but also to suppress and control the transfer of heat from the bath to the metal in the delivery duct by circulation of metal (thermal convection currents) which are caused by the great temperature difference and correspondingly great difference in density between the metal in contact with the bath and the metal in the cooler upper part of the duct.

It is understood that the narrow opening at 3 is only illustrative and that various forms of shapes and openings providing a small cross-sectional area may be used.

Fig. 2 illustrates another form of constricted duct in which the duct is preferably rectangular in cross-section and flares outwardly from the constriction 4.

I may control the amount of heat admitted to the metal in the duct by regulating the cross-sectional area of the duct. For example, in Fig. 3 the plug 5 may be raised and lowered by means of rod 6 in the constriction 7 so that the flared portion at the lower end constricts the cross-section of the duct to a greater or less degree. Plug 5 may be made of metal having high resistance to the flow of heat, like stainless steel or laminated plates and has a central opening 8 forming a nozzle. The differences in density which are caused by differences in temperature in the metal cause the metal to rise at a relatively high velocity through the opening 8 and to flow downward on the outside of the plug in the constricted part of the duct. By raising and lowering plug 5 and thus controlling the downward flow of metal, it is possible to regulate the amount of heat carried by the metal from the lower to the upper part of the duct by way of the passage through opening 8. Likewise a thermal insulating baffle, for example one like baffle 11 in the delivery duct shown in Fig. 4, may be adjustably mounted in the duct to control the cross-sectional area of the duct.

As illustrated in Fig. 4, the metal delivery duct 10, preferably of rectangular cross-section, has a thermal barrier 11 mounted near the upper surface of the bath. This barrier is constructed of metal, the inner portion thereof being filled with an insulating material, such as diatomaceous earth, and it is preferably so shaped that it also serves as a deflecting baffle. The face 12 is preferably inclined slightly to guide the rising metal and the accompanying gas through the restricted passage 13 and the wall 14 is so inclined that sedimentary impurities which descend along the left side of the duct are deflected to the small opening 15. The openings 13 and 15 are preferably only narrow slits no larger than necessary to permit the passage of the rising metal and gas and the descending impurities, and the thermal barrier 11 accordingly occupies a very substantial part of the cross-sectional area of the duct. By applying a thermal insulation 18 on one side of the duct, the thermal conditions on two sides of the duct are unlike and the amount of heat carried to the top of the duct by the stream rising through passage 13 and returning through passage 15 may be controlled. The baffle 11 is pivotally mounted on the member 19 and may be tilted by means of rod 16 and screw 17.

Another means of control is shown in Fig. 5 in which the cross-sectional area of the metal in the duct is made very small at a suitable point by means of insulating baffle 20. I prefer to use a duct of rectangular cross-section and may locate the barrier in vertical guide slots (not shown) and suspend it on a rod 27 which passes through the top 23. By means of the screw device 21, the barrier is adjustably suspended and may be slid up and down to remove accumulations of impurities which sometimes obstruct the passage 24. A steel plate or baffle 25 extends from the lower end of baffle 20 into the bath. A second piece of steel plate 26 connected to rod 22 extending upward inside of pipe 27 which supports baffle 20 can be made to slide up and down over the surface of baffle 25 so that holes 28 and 29 in the two plates are made to register more or less completely and permit a controlled circulation, as shown by the arrows, of hot metal upward with the crude metal and downward flow through passage 24 of cooler denser metal bearing sedimentary impurities. This circulation is made more positive by placing thermal insulation 30 on the outside of the wall of the duct at that side where the crude hot metal rises to make thermal conditions at this side unlike conditions on the opposite side of the duct. By controlling the amount of circulation of metal through openings 28 and 29, the amount of heat admitted from the bath may be regulated in such manner as to balance the dissipation of heat from the upper walls of the duct while maintaining the most favorable temperature conditions in the metal in the duct. Furthermore the limited and controlled thermal convection currents are utilized to assist in returning the sedimentary impurities to the bath through passage 24.

The delivery duct 31 of Fig. 6 comprises an enlarged section 32 wherein a relatively small amount of metal is confined within surfaces of appreciable area, thereby causing a high dissipation of heat and consequent cooling of the metal in the duct near the upper surface of the bath. This pre-cooling of the metal reduces the heat carried into the duct above and causes a separation of the impurities at a relatively low part of the duct. A somewhat similar effect is accomplished in the apparatus of Fig. 7 in which cooling surface 35 is mounted in the duct 36 near the upper surface of the bath, or the walls of the duct may be air cooled below the bath as shown at 37. In each of these embodiments of the invention, the amount of heat flowing from the bath into that part of the duct which is above the bath is reduced so that the temperature of the metal is lower, precipitation of impurities occurs lower in the duct and there is less agitation of the metal due to thermal convection currents.

It is an object of the invention to suppress the upward flow of heat through the metal in the delivery duct not only at places in the vicinity of the cover of the cell but at any desired distance below the upper surface of the bath. As illustrated in Fig. 8, the delivery duct 40 is provided with a heat suppressing device 41 which may embody the construction of any of the forms of the invention illustrated in Figs. 1 to 7. In order to prevent a return of heat to the metal in the delivery duct at a point above the heat suppressing device 41, I surround the delivery duct beneath the cover or the upper surface of the bath, as the case may be, with a thermal insulation 42. I may advantageously extend this insulation to any desired distance below the heat suppressing device 41. The thermal insulation 42 may be provided by filling a pair of concentric metal jackets with an insulating material, such as diatomaceous earth, and by leaving an annular space 43 to further impede the flow of heat from the bath into the metal in the duct 40. I may also effect a further control over the transmission of heat to and from the metal in the duct 40 by circulating a heat absorbing fluid through the space 43.

In the modification of apparatus shown in Fig. 9, the duct 50 comprises an intermediate section or part 51 having a cylindrical bore 52 in which a closely fitted conveyor 53 is mounted having a central opening 54 through which metal and gas flow upward into the upper section or part of the duct 55. The control member is suspended in the bore 52 on the shaft 56 rotatably mounted in the thrust bearing 57 which is sealed with a stuffing box. The shaft 56 and conveyor 53 may be rotated from time to time as by hand, or more or less continuously by the application of mechanical power as through a reduction gear driven by a motor (not shown). The exterior of conveyor 53 has a helical duct 58, preferably a thread of suitable pitch, communicating with the metal above and below the section 51. The lower section or part 59 of the opening 54 is flared outward and the upper part of the opening connects with lateral passages 60 which lead into the spaced annular baffle 61. The section 51 is preferably located at the upper surface of the bath or just above the cover of the bath container, and in order to suppress the lateral flow of heat from the bath into the duct, I place a thermal insulating unit 62 around the section. As shown, this comprises a jacket filled with diatomaceous earth or the like 63 and a space 64 for circulating a cooling fluid when the extraction of heat is desired. In order to suppress an undue flow of heat from passage 54 through conveyor 53 into the duct 58, I may surround duct 54 with a thermal insulation 69.

In order to direct the passage of gas through the central opening 54, I provide baffles 65 and 67 to prevent gas from rising into the lower part of duct 50 except by way of a slit 66 in the baffle 67 through which the gas enters only on one side of the duct. I arrange a baffle 68 above the slit 66 to direct the gas into the flared end of opening 54.

In operating the apparatus of Fig. 9, the hot crude metal and gas flow upward through the opening 54 into the upper part of the duct 55 and into the receiver as shown by the arrows. The control member 53 and its companion piece 51 are preferably formed of metal having high resistance to the flow of heat, like iron, and thus serve as a thermal barrier, preventing a flow of heat into the metal above by conduction and by uncontrolled thermal convection currents. This favors a separation of impurities in the metal above section 51 which settle downwardly in the upper part of the duct 55 and accumulate near the upper end of conveyor 53. When the conveyor 53 is rotated, the impurities together with some metal are forced downward and released in the lower part of the duct from which the impurities settle into the bath. The operation accordingly involves a natural upward flow of the metal under the action of gravity and an induced downward flow of the impurities. By varying the rate of rotation of the conveyor 53, the amount of metal drawn down with impurities by conveyor 53 may be regulated, and since an equivalent amount of hot metal flows upward through passage 54 in addition to the crude metal, this affords a method of controlling the amount of heat admitted to the metal in the upper part 55 from the lower part 70 of the duct 50 which is in contact with the bath.

Under certain conditions, for example, when the amount of metal passing through duct 54 is small, it will be found advantageous to place the thermal insulation 69 around the wall of that part of passage 54 which is below the branch passages 60 to avoid the possibility of obstructions forming on the wall of this passage.

Copending application Serial Number 415,095, filed October 15, 1941, describes and claims related subject matter.

I claim:

1. Apparatus for purifying a light metal recovered from a fused salt bath which comprises a metal collecting hood submerged in the bath, a duct through which the metal rises due to its buoyancy upward from the hood to a receiver for the metal, a thermal barrier mounted in the duct which decreases the cross-sectional area of the duct, and adjusting means for moving the thermal barrier upward or downward with respect to the upper surface of the bath.

2. Apparatus for purifying a light metal recovered from a fused salt bath which comprises a metal collecting hood submerged in the bath, a duct for passing metal upward from the hood to a receiver for the metal, a constriction in the duct near the upper surface of the bath, a flared nozzle adjustably mounted in the duct, and means for adjustably positioning the nozzle in the constriction.

3. Apparatus for purifying a light metal recovered from a fused salt bath which comprises a metal collecting hood submerged in the bath, a duct for passing metal upward from the hood to a receiver for the metal, impeller means in operative association with the duct to force impurities to return to the bath from the upper part of the duct, and means permitting the metal to flow upward in the duct while the impeller is forcing impurities downward to the bath.

4. Apparatus for purifying a light metal recovered from a fused salt bath which comprises a metal collecting hood submerged in the bath, a duct for passing metal upward from the hood to a receiver for the metal, a conveyor in the duct for forcing impurities to return to the bath from the upper part of the duct, and a restricted passage for metal to flow upward in the duct while impurities are being forced downward by the conveyor.

5. Apparatus for purifying a light metal recovered from a fused salt bath which comprises a metal collecting hood submerged in the bath, a duct for flowing metal upward from the hood to a receiver for the metal, insulating material between the duct and the bath to suppress the flow of heat through the duct into the metal in the duct, means in the duct decreasing the cross-sectional area thereof to suppress the flow of heat from the bath upward in the metal in the duct, means for maintaining the metal in the upper part of the duct at a sufficiently low temperature that dissolved impurities are precipitated from the metal, and means for suppressing convection currents in the metal in the duct to permit sedimentation of the precipitated impurities and their return to the bath below the hood.

6. Apparatus for purifying a light metal recovered from a fused salt bath which comprises a metal collecting hood submerged in the bath wherein the metal collects over the bath therein, an upright duct for passing the hot metal collected under the hood upward due to its buoyancy to a receiver for the metal, a portion of the duct extending above the bath and connecting with the receiver, means in a part of the duct reducing the cross-sectional area of the metal in the duct whereby a high resistance is offered to the flow of heat upward in the metal in the duct, the duct immediately above said means being out of direct thermal contact with the bath, whereby heat does not flow from the bath through the duct into the metal above said means, means for maintaining the metal in the duct above said means at a sufficiently low temperature that dissolved impurities are precipitated from the metal, and means for suppressing convection currents in the metal in the duct where the metal flows into the receiver to permit sedimentation of the precipitated impurities and their return to the bath below the hood.

7. Apparatus for purifying a light metal recovered from a fused salt bath which comprises a metal collecting hood submerged in the bath wherein the metal collects over the bath therein, an upright duct for passing the hot metal collected under the hood upward due to its buoyancy to a receiver for the metal, a portion of the duct extending above the bath and connecting with the receiver, a constriction in the duct reducing the cross-sectional area of the metal in the duct whereby a high resistance is offered to the flow of heat upward in the metal in the duct, means for maintaining the metal in the duct above the constriction at a lower temperature than the metal entering the hood to cause a precipitation of dissolved impurities from the cooler metal, and means for suppressing convection currents in the cooler metal in the duct to permit sedimentation of the precipitated impurities and their return to the bath below the hood.

8. Apparatus for purifying a light metal recovered from a fused salt bath which comprises a metal collecting hood submerged in the bath wherein the metal collects over the bath therein, an upright duct for passing the hot metal collected under the hood upward due to its buoyancy to a receiver for the metal, a portion of the duct extending above the bath and connecting with the receiver, means in the duct near the upper surface of the bath for suppressing the flow of heat upward in the metal in the duct, the duct immediately above said means being out of direct thermal contact with the bath whereby heat does not flow from the bath through the duct into the metal above said means, means for maintaining the metal in the upper part of the duct above the bath at such a low temperature that dissolved impurities precipitate from the metal, the thermal conditions in the metal near where it overflows into the receiver being such that there is a substantial absence of convection currents thereby permitting an effective sedimentation of the precipitated impurities, and means for returning the precipitated impurities to the bath beneath the hood.

ROBERT J. McNITT.